(12) United States Patent
Johnson et al.

(10) Patent No.: US 6,231,036 B1
(45) Date of Patent: *May 15, 2001

(54) MECHANISM FOR CLAMPING AND HOLDING AN ELONGATED WORKPIECE

(75) Inventors: Stephen A. Johnson, South Bend; David J. Konieczny, Union Mills, both of IN (US)

(73) Assignee: SSD Control Technology, Inc.,, South Bend, IN (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/081,223

(22) Filed: May 19, 1998

(51) Int. Cl.[7] .................................................. B23Q 3/08
(52) U.S. Cl. ............................ 269/56; 269/229; 269/910; 198/345.1
(58) Field of Search .............................. 269/910, 56, 229, 269/55, 13, 14, 289 MR; 100/DIG. 13; 198/345.1; 144/242.1

(56) References Cited

U.S. PATENT DOCUMENTS

| 4,084,498 | * | 4/1978 | Weaver | 269/910 |
| 4,638,756 | * | 1/1987 | Collmann | 198/345.1 |
| 5,099,979 | * | 3/1992 | Kehrel | 198/345.1 |
| 5,353,910 | * | 10/1994 | Harris et al. | 198/345.1 |
| 5,829,571 | * | 11/1998 | Mizuta et al. | 198/345.1 |
| 5,873,566 | * | 2/1999 | Cadwaller et al. | 269/229 |

OTHER PUBLICATIONS

Two drawings illustrating a clamping device.—SSD Control Technology Inc. (Admitted Prior Art).

* cited by examiner

Primary Examiner—Robert C. Watson
(74) Attorney, Agent, or Firm—Marshall, O'Toole, Gerstein, Murray & Borun

(57) ABSTRACT

A mechanism for clamping and holding an elongated workpiece in a machine includes a fixed support, and a longitudinally extending conveyor for supporting the workpiece relative to support. A pair of longitudinally extending clamping members are slidably mounted on the support and are retrained for transverse movement relative to the conveyor. A camming mechanism is actuated by power cylinders to move the clamping members into clamping engagement with opposite sides of the workpiece.

12 Claims, 6 Drawing Sheets

MECHANISM FOR CLAMPING AND HOLDING AN ELONGATED WORKPIECE

This invention relates to a mechanism for clamping and holding an elongated workpiece for processing.

Polyvinyl tubing is commonly used for many purposes, such as fencing, lawn furniture, etc. Such applications require that the tubing be processed by, for example, forming openings in the side walls of the tubing to accommodate other components of the article being manufactured. This processing is commonly carried out by a template guided router which is used to cut openings in the sides of the tubing. Obviously, it is necessary to support, align, and center the tubing while it is being processed, but it is also necessary to be able to quickly insert and remove the tubing from the processing equipment. Although the particular embodiment disclosed herein relates to polyvinyl tubing and the processing of such tubing by cutting openings in the sides of the tubing, the clamping device disclosed may also be used in other types of processing, and with other elongated workpieces. The workpieces must be held securely in a predetermined location as the workpiece is being processed. It is also desirable that the clamp center the workpiece relative to the processing equipment and also quickly engage and release the workpiece. Furthermore, the clamping mechanism should be relatively simple and inexpensive. Prior art devices for clamping and holding elongated workpieces include relatively complicated rails, threaded shafts, and other components which are relatively difficult to align and maintain. These prior art devices involve many moving parts, and the clamping force exerted is limited and often insufficient.

According to the present invention, the workpiece is supported on a conveyor, which may be raised and lowered to accommodate tubing of different sizes. Gaps are provided in the conveyor through which arms extend that are pivotally connected with longitudinally extending clamping members which are guided for transverse movement relative to the workpiece by bearings slidable on a transversely extending rail. The arms are components of a camming mechanism and are connected to rotating plates which are rotatably mounted on the support and which is connected to the other rotating plates operating the clamping members by tie rods. One or more power cylinders are provided for rotating the plates. Accordingly, upon rotation of the plates, the clamping members are moved inwardly toward the center line of the conveyor to engage the workpiece and, when released, move away from the centerline thereby releasing the workpiece. Accordingly, since the clamping members move relative to the center line, the mechanism automatically centers the workpiece along the center line of the conveyor, and the clamping members can accommodate tubing of various sizes since the clamping members are moved inwardly toward the center line of the apparatus until they engage the workpiece.

These and other advantages of the present invention will become apparent from the following description, with reference to the accompanying drawings, in which.

Figure 1:
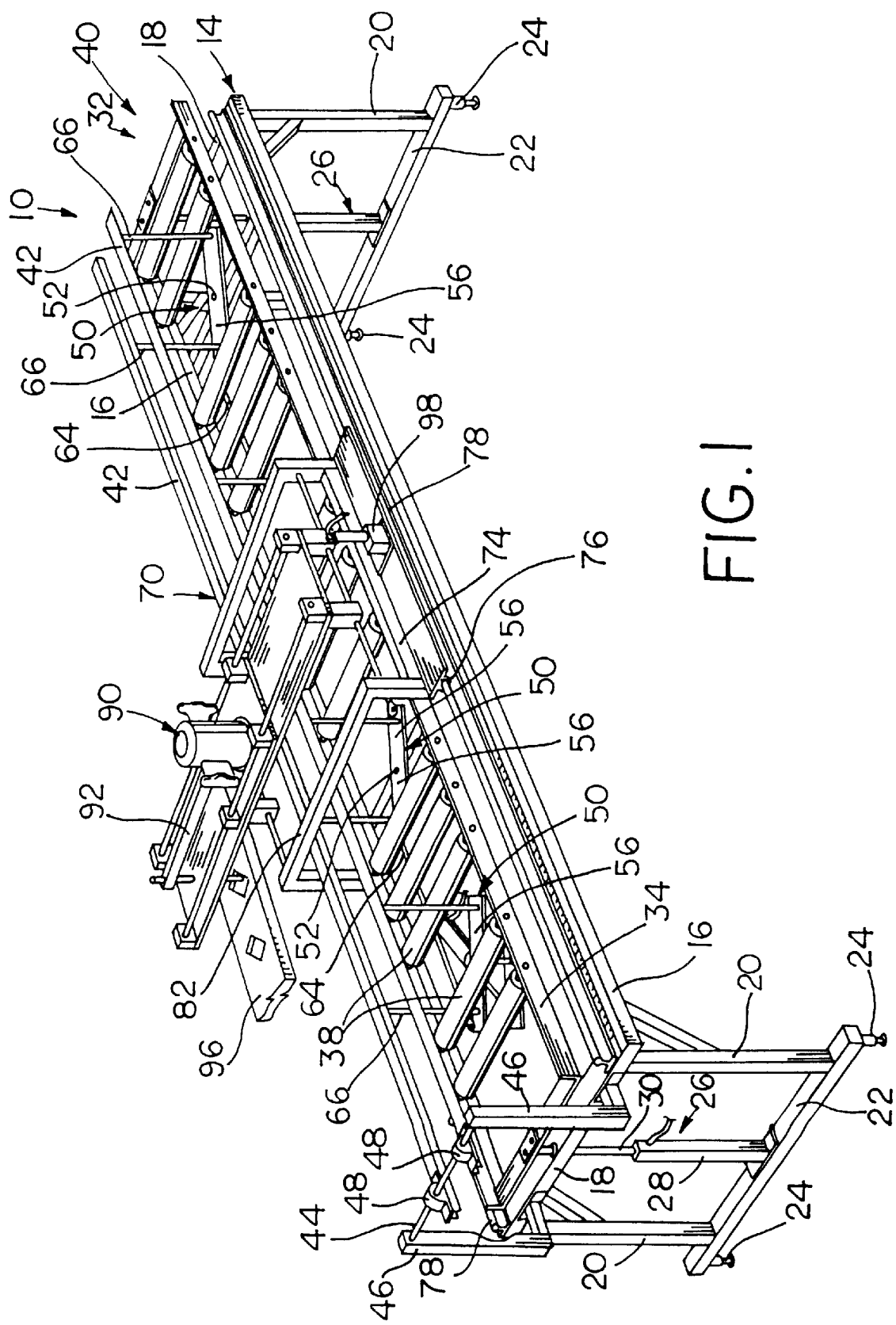
FIG. 1 is a fragmentary view in perspective of a process machine for processing elongated articles, such as polyvinyl tubing, incorporating a clamping mechanism made pursuant to the teachings of the present invention.
Figure 2:
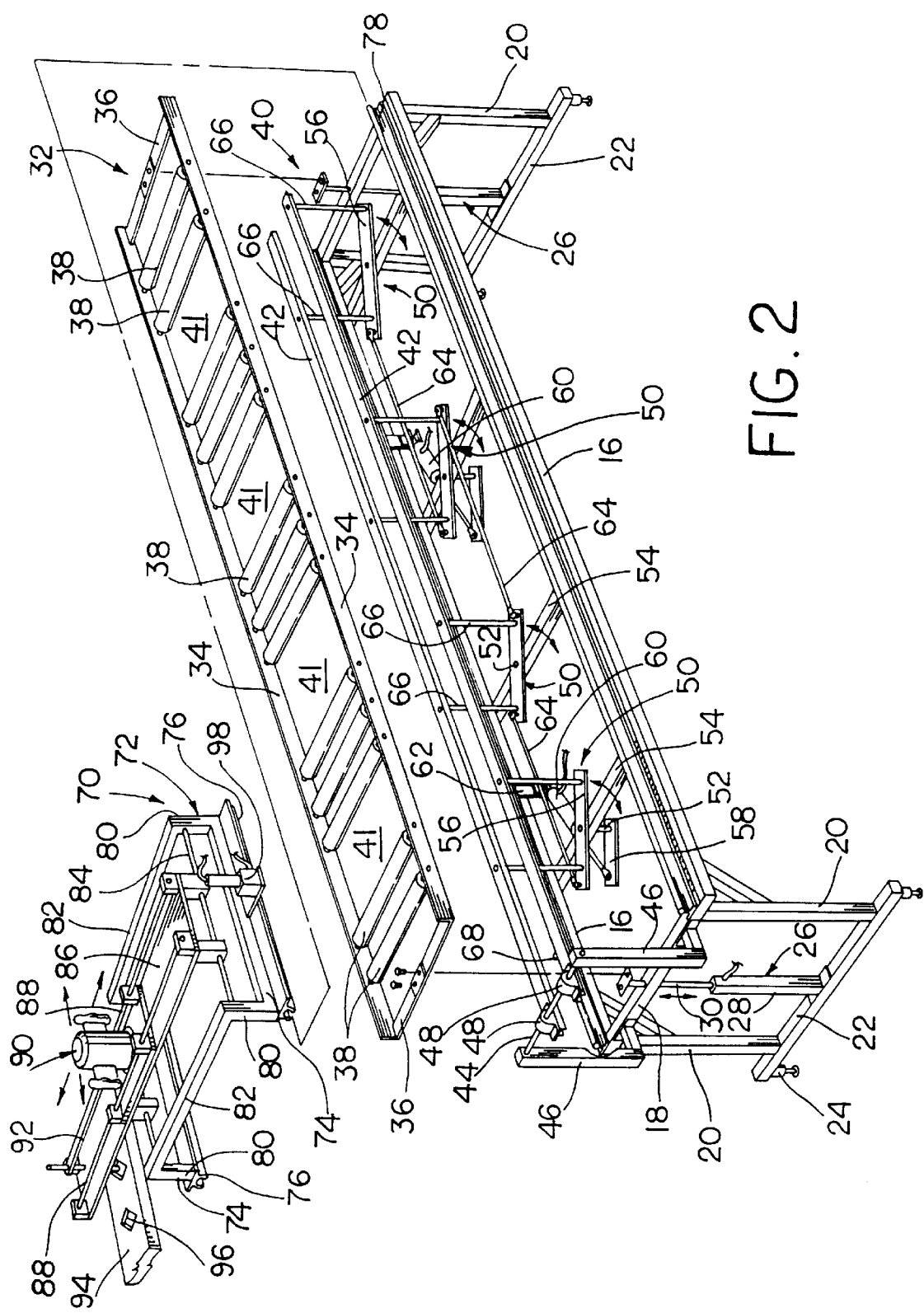
FIG. 2 is an exploded view of the apparatus illustrated in FIG. 1.
Figure 3:
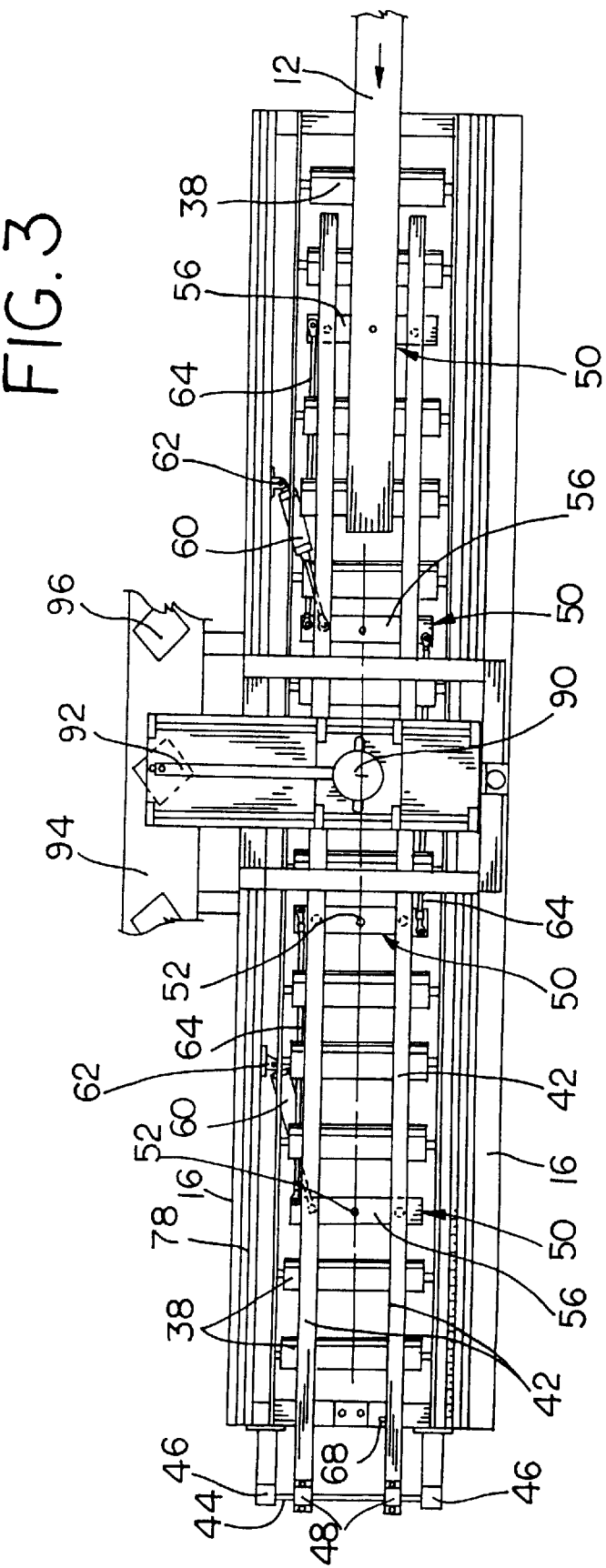
FIG. 3 is a fragmentary top plan view of the apparatus illustrated in FIG. 1, with a workpiece illustrated being installed in the device.

Referring now to the drawings, a machine 10 for cutting openings in the side walls of an elongated workpiece 12 (FIG. 3) includes a fixed support or table generally indicated by the numeral 14, which includes a pair of longitudinal side frame members 16, and a pair of transversely extending upper end frame members 18 which interconnect the side frame members 16. Legs 20 extend downwardly from each end of both side frame members 16. A lower transverse member 22 interconnects the legs 20 on each end of the machine 10. Levelers 24 extend downwardly from each end of both lower transverse members 22. A pair of elevators 26 are installed on each of the lower transverse members 22 and consist of an outer member 28 and an inner member 30 which extends from, and retracts into, the outer member 28. The inner member 30 extends through the corresponding upper end frame member 18. The elevators 26 may be operated manually, such as by a crank, pneumatically, or in any other manner.

A conveyor generally indicated by the numeral 32 is supported along the center line defined by the side frame members 16 by the elevators 26. The conveyor 32 includes a pair of side frame members 34 which extend substantially parallel to the side frame members 16 of the fixed support or table 14. Conveyor 32 further includes transverse end members 34 which are secured to the inner members 30 of elevators 26. Accordingly, by operation of the elevators 26, the conveyor 32 may be raised and lowered relative to the fixed support or table 14. Conventional rollers 38 extends between the side members 34 and are journaled for rotation relative thereto. It will be noted that intermittent gaps 40 are provided between sets of the rollers 38 in which the spacing between rollers is substantially greater than the normal spacing between the rollers 38.

Figure 4:
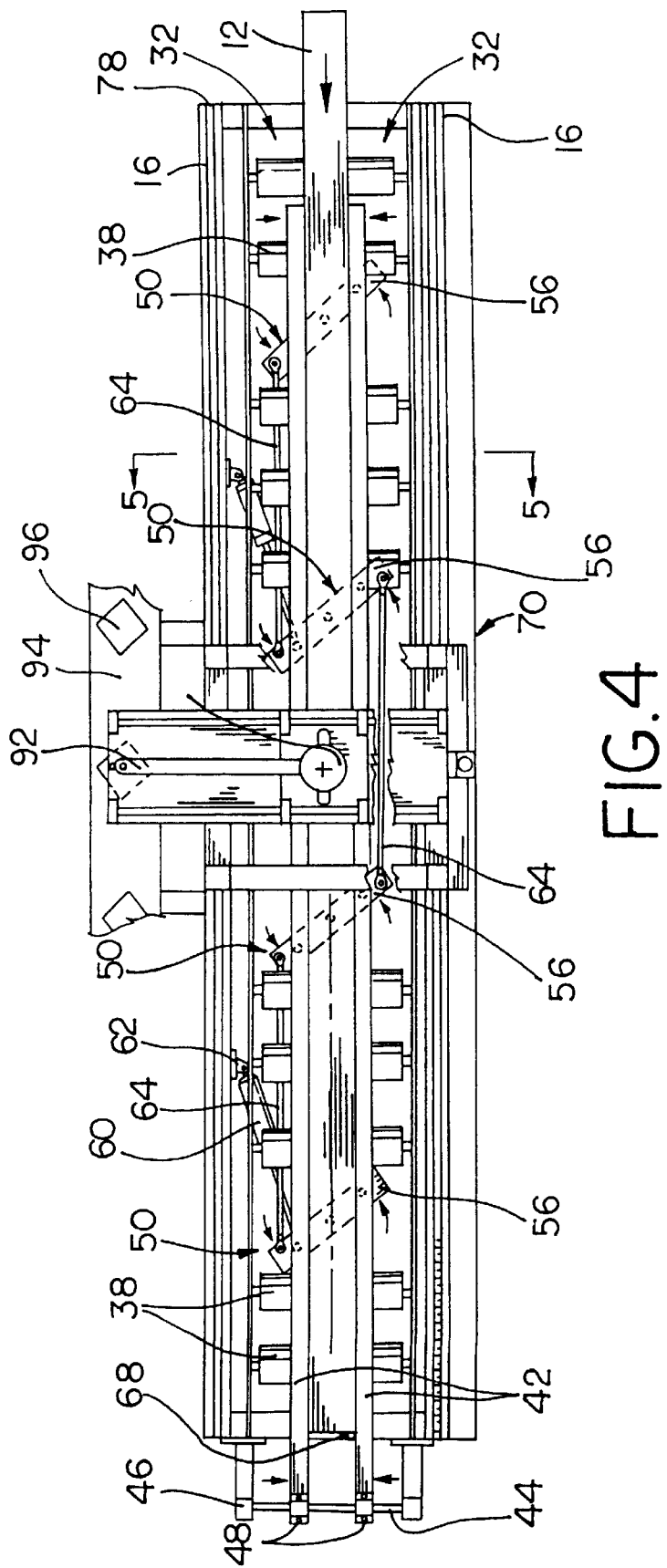
FIG. 4 is a view similar to FIG. 3, but illustrating the workpiece installed in the apparatus and with the clamping members engaging the workpiece to hold the workpiece in place for processing.

A clamping and holding mechanism generally indicated by the numeral 40 includes a pair of longitudinally extending, transversely spaced clamping members 42 which extend generally parallel to the side frame members 16. A shaft 44 is mounted between a pair of extensions 46 extending upwardly from the end frame member 18 on one end of the support or table 14. Glides 48 are mounted on one end of each of the clamping members 42 and are slidably engaged with the shaft 44, to thereby restrain the clamping members 42 to movement transverse to the conveyor 32 and restraining the clamping members 42 against longitudinal movement. The clamping members 42 are actuated by camming members generally indicated by the numeral 50. Each of the camming members 50 includes an axle 52 which is rotatably supported in a corresponding one of cross members 54 which extend between the side frame members 16 intermediate the end frame members 18. A radially extending plate 56 is mounted for rotation with each axle 52 on the end thereof that projects above the cross members 54. A crank arm 58 is mounted for rotation with some of the axles 52 and is mounted on the end thereof extending below the cross members 54. Each of the crank arms 58 is operated by a pneumatic actuator 60 which extends between each crank arm 58 and a bracket 62 mounted on one of the side frame members 16. Tie rods 64 are pivotally connected between a corresponding end of adjacent plates 52, so that rotation of any of the plates 56 will be transferred to rotate all of the other plates 56 in the same direction. Arms 66 are rigidly mounted adjacent opposite ends each of the plates 56 and extend upwardly therefrom. Each of the arms 66 are pivotally engaged with a corresponding arm of the clamping members 42. Accordingly, when pneumatic actuators 60 are operated to turn the crank arm 58 in the counterclockwise direction (viewed from above), the plates 56 will be rotated in the same direction and, because the arms 66 are rigidly connected to the plates 56 but pivotally connected to the clamping members 42, will move the clamping members 42 transversely toward the center line of the conveyor 32. When the pneumatic actuators are operated to rotate the crank arms 58 and plates 56 in the clockwise direction, the clamping members 42 are spread apart. One of the clamping members 42 carries a spring loaded pin 68 that is urged outwardly from the inner edge of the clamping member to engage an end of the workpiece 12 as most clearly illustrated in FIG. 4, to thereby locate the workpiece in a predetermined position relative to the machine 10 when the work piece is processed as will hereinafter be explained.

A router carriage generally indicated by the numeral 70 includes a bridge 72 having opposite ends 74 which are provided with glides 76 to slidably engage a corresponding one of rails 78 which are mounted on the side frame members 16 and extend upwardly therefrom. Accordingly, the bridge 72 may slide along the side frame members 16 between the ends of the table or export 12. The height of the bridge is established by upwardly extending portions 80 so that transverse portions 82 clear the conveyor 32 and the clamping members 42. Shafts 84 extend between corresponding uprights 80 substantially parallel to the side frame members 16. A router support member 86 is slidably mounted on the shafts 84 for movement longitudinally along the conveyor 32. Router support 86 carries a pair of transversely extending shafts 88 which slidably engage the router 90 to guide the router for movement transverse to the conveyor 32. Accordingly, by sliding relative to the shafts 84 and 88, the router 90 can be positioned at any point along the upper side of the workpiece 14 when the workpiece 14 is installed in the machine 10 and engaged by the clamping members 42. The router 90 is guided by a conventional follower arm 92 which traces on the pattern 96 incorporated within a template 94, in a manner well known to those skilled in the art. Necessary electrical connections to the router 90 are made by electrical wiring extending through a clamp 98 attached to the carriage 70.

Figure 5:
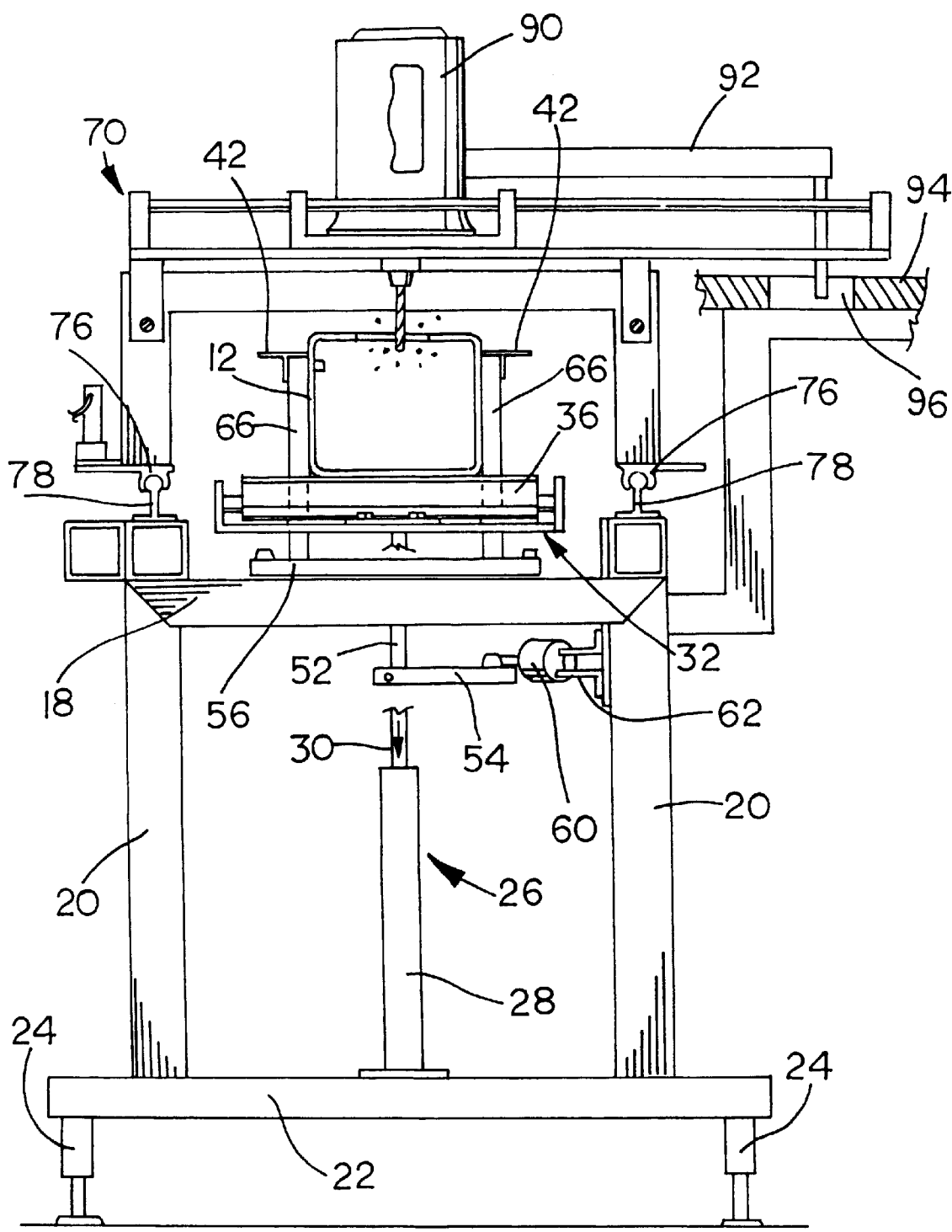
FIG. 5 is a cross sectional view taken substantially along lines 5—5 of FIG. 1.
Figure 6:
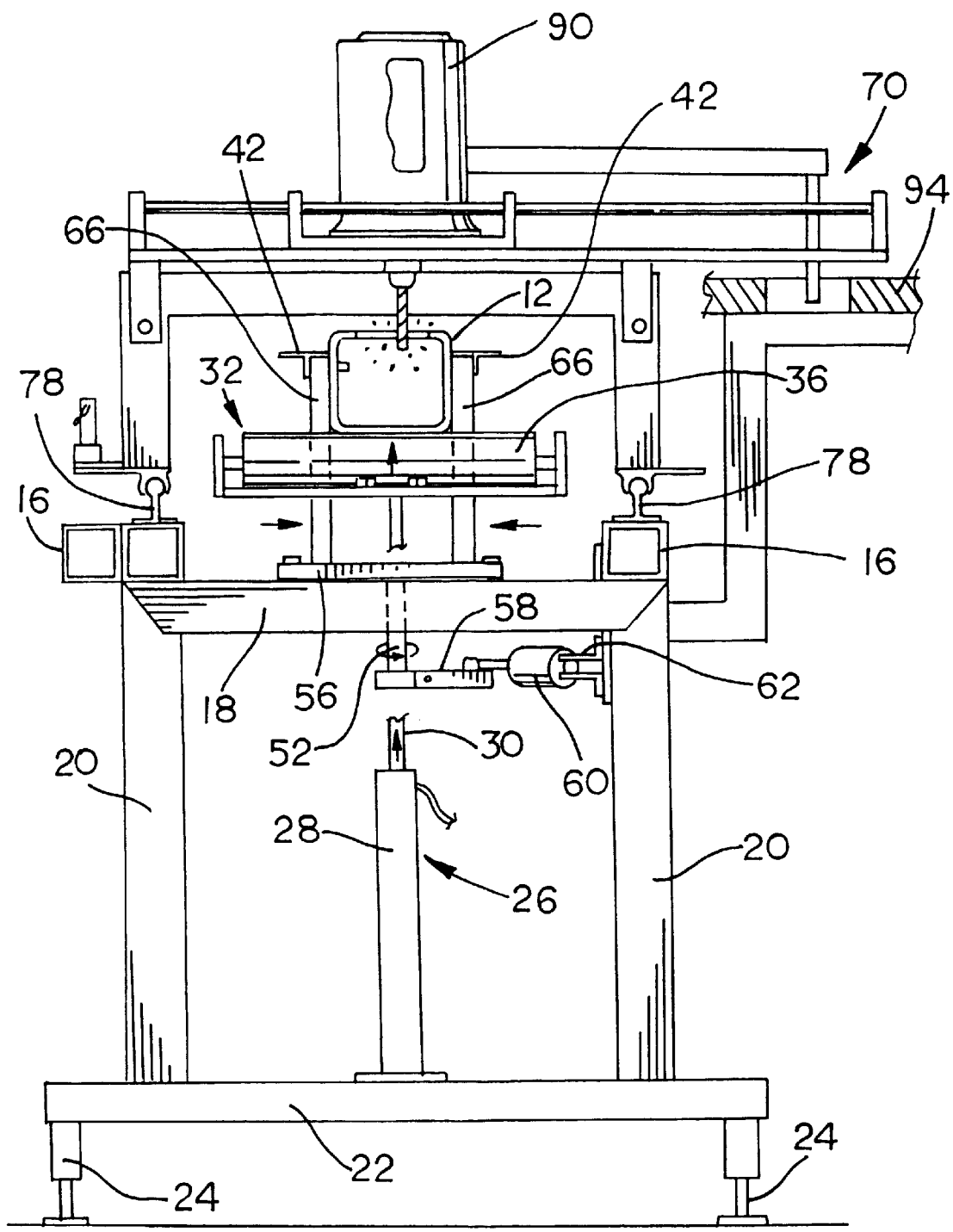
FIG. 6 is a view similar to FIG. 5, but illustrating the manner in which the device can be adjusted to accommodate a workpiece of a smaller size than the workpiece illustrated in FIG. 5.

In operation, the workpiece 12 is placed upon the rollers 38 from the right hand end of the machine 10 (viewing FIGS. 1–4). The workpiece 12 is supported by the rollers 38, and the operator may easily push the workpiece 12 into the machine 10 until the end of the workpiece engages the pin 68 to locate the workpiece relative to the machine 10. The height of the conveyor 32 may be adjusted by operation of the elevators 26 to bring the workpiece 12 to the proper height where it may be kept by the router 90 and in which the end of the workpiece will engage the spring loaded pin 68. For example, in FIG. 5, a relatively large cross section workpiece is being processed, so such that the elevators 26 are used to lower the conveyor 32, and FIG. 6 illustrates a smaller cross section workpiece in which the conveyor 32 has been raised to properly position the workpiece 12. After the workpiece has been installed in the machine 10, pneumatic actuators 60 are operated to rotate the camming members 50. Since the axle 52 of each camming member 50 is located along the centerline of the machine 10, rotation of the camming members 50 in the counterclockwise direction (viewed from above) causes the clamping members 42 to move towards the center line of the conveyor 32, each clamping member 42 moving towards the center line from opposite directions. Accordingly one of the clamping members 42 will engage the side of the workpiece before the other clamping member 42 engages the other side of the workpiece, unless the workpiece is aligned along the center line. The work piece will be moved transversely as the clamping members 42 close against opposite sides of the workpiece, thereby aligning the center line of the workpiece along the center line of the machine 10.

Processing of the workpiece using the router 90 may then begin. The carriage 70 is moved manually along the tracks 78 along the template 96, which extends along the side of the machine. After the auger 92 is installed in the apertures 94 defined in the template 94, operation of the router is initiated to cut the desired apertures in the workpiece. Accordingly, the carriage 70 is moved manually along the workpiece to cut successive apertures. Of course, it is within the scope for the invention to use the clamping mechanism with more automated types of machines, in which the router or equivalent cutting or processing device is indexed by numerical control along the length of the workpiece. It is also obviously within the scope of the invention to provide other types of processing of the workpiece other than by router, and processing of different types of workpieces, such as shafts, elongated metal parts, etc.

What is claimed:

1. Mechanism for clamping and holding an elongated workpiece for processing comprising a fixed support, a longitudinally extending conveyor for supporting the workpiece relative to the support, a pair of longitudinally extending clamping members slidably mounted on said support for transverse movement relative to said conveyor toward and away from said workpiece, camming means for moving said clamping members toward and away from said workpiece and drive means for operating said camming means, said camming means including a camming member rotatably mounted on said support, said camming member being pivotally attached to said clamping members whereby rotation of the camming member moves said clamping members toward and away from the workpiece, said camming member including an axle rotatably mounted on said support, a radially extending member extending radially from said axle, and a pair of arms projecting from said radially extending member, each of said arms being pivotally connected to a corresponding clamping member, said conveyor being mounted between said radially extending member and said clamping members.

2. Mechanism as claimed in claim 1, wherein said conveyor includes gaps through which said arms extend.

3. Mechanism for clamping and holding an elongated workpiece for processing comprising a fixed support, a longitudinally extending conveyor for supporting the workpiece relative to the support, a pair of longitudinally extending clamping members slidably mounted on said support for transverse movement relative to said conveyor toward and away from said workpiece, camming means for moving said clamping members toward and away from said workpiece drive means for operating said camming means, and an adjustment member mounting said conveyor for movement relative to said base in a direction toward and away from said clamping members.

4. Mechanism for clamping and holding an elongated workpiece for processing comprising a fixed support, a longitudinally extending conveyor for supporting the workpiece relative to the support, a pair of longitudinally extending clamping members slidably mounted on said support for transverse movement relative to said conveyor toward and away from said workpiece, camming means for moving said clamping members toward and away from said workpiece, drive means for operating said camming means, said drive means including an actuator for operating said camming means, said camming means includes multiple longitudinally spaced camming members, and a tie rod connecting each camming member to another camming member to permit said actuator to operate multiple camming members.

5. Mechanism as claimed in claim 4, wherein said actuator is connected between said support and one of said camming members.

6. Mechanism for clamping and holding an elongated workpiece for processing comprising a fixed support, a longitudinally extending conveyor for supporting the workpiece relative to the support, a pair of longitudinally extending clamping members slidably mounted on said support for transverse movement relative to said conveyor toward and away from said workpiece, an adjustment member adapted to mount said conveyor for movement relative to said support in a direction toward and away from said clamping members, camming means for moving said clamping members toward and away from said workpiece, said camming means including a camming member having an axle and being rotatably mounted on said support, the camming member including a radially extending member extending radially from said axle, the camming member further having a pair of arms projecting from said radially extending member, each of said arms being pivotally connected to a corresponding clamping member whereby rotation of the camming member moves said clamping members toward and away from the workpiece, and drive means for operating said camming means.

7. Mechanism for clamping and holding an elongated workpiece for processing comprising a fixed support, a longitudinally extending conveyor for supporting the workpiece relative to the support, a pair of longitudinally extending clamping members slidably mounted on said support for transverse movement relative to said conveyor toward and away from said workpiece, camming means for moving said clamping members toward and away from said workpiece, said camming means including multiple longitudinally spaced camming members rotatably mounted on said support, each of said camming members having an axle rotatably mounted on said support, a radially extending member extending radially from said axle, and a pair of arms projecting from said radially extending member, each of the camming members further being joined by a tie rod connecting the radially extending member of each camming member to the radially extending member of another camming member, each of said arms being pivotally connected to a corresponding clamping member whereby rotation of the camming members moves said clamping members toward and away from the workpiece, and drive means for operating said camming means.

8. Mechanism for clamping and holding an elongated workpiece for processing comprising a fixed support, a longitudinally extending conveyor for supporting the workpiece relative to the support, a pair of longitudinally extending clamping members slidably mounted on said support for transverse movement relative to said conveyor toward and away from said workpiece, each of said clamping members including bearings slidably engaging support rails extending transversely with respect to the conveyor, camming means for moving said clamping members toward and away from said workpiece, and drive means for operating said camming means.

9. Mechanism for clamping and holding an elongated workpiece for processing comprising a fixed support, a longitudinally extending conveyor for supporting the workpiece relative to the support, a pair of longitudinally extending clamping members slidably mounted on said support for transverse movement relative to said conveyor toward and away from said workpiece, multiple camming members each including a rotatable member rotatably mounted on said fixed support and further including arms pivotally engaging the clamping members, each of said clamping members including bearings slidably engaging support rails extending transversely with respect to the conveyor, and drive means for operating said camming members.

10. Mechanism as claimed in claim 9, wherein said rotatable member includes an axle, a radially extending member extending radially from said axle, and a pair of arms projecting from said radially extending member, each of said arms being pivotally connected to a corresponding clamping member.

11. Mechanism for clamping and holding an elongated workpiece for processing comprising a fixed support, a longitudinally extending conveyor for supporting the workpiece relative to the support, a pair of longitudinally extending clamping members slidably mounted on said support for transverse movement relative to said conveyor toward and away from said workpiece, said conveyor being mounted between said rotatable member and said clamping members, multiple camming members each including a rotatable member rotatably mounted on said fixed support and further including arms pivotally engaging the clamping members, each of said rotatable members including an axle, a radially extending member extending radially from said axle, and a pair of arms projecting from said radially extending member, each of said arms being pivotally connected to a corresponding clamping member, and drive means for operating said camming members.

12. Mechanism for clamping and holding an elongated workpiece for processing comprising a fixed support, a longitudinally extending conveyor for supporting the workpiece relative to the support, a pair of longitudinally extending clamping members slidably mounted on said support for transverse movement relative to said conveyor toward and away from said workpiece, adjustment means for mounting said conveyor for movement relative to said fixed support in a direction toward and away from said clamping members, multiple camming members each including a rotatable member rotatably mounted on said fixed support and further including arms pivotally engaging the clamping members, and drive means for operating said camming members.

* * * * *